United States Patent [19]

Maeshiba

[11] 4,444,419
[45] Apr. 24, 1984

[54] STRUCTURE FOR PREVENTION OF MIXING OF DIFFERENT KINDS OF OILS FOR OIL-FEEDING COUPLINGS

[76] Inventor: Sozaburo Maeshiba, 1-33 2 chome, Tani, Chuo-ku Fukuoka, Japan

[21] Appl. No.: 353,213

[22] Filed: Mar. 1, 1982

[51] Int. Cl.³ .............................................. F16L 37/12
[52] U.S. Cl. ................................ 285/12; 285/320; 285/DIG. 15
[58] Field of Search ............... 285/DIG. 15, 12, 320; 339/186 M, 186 R, 186 T

[56] References Cited

U.S. PATENT DOCUMENTS

| 999,169 | 7/1911 | Jones | 285/320 X |
|---|---|---|---|
| 1,815,660 | 7/1931 | Walker | 285/320 X |
| 3,096,135 | 7/1963 | Feustel et al. | 339/186 M |
| 3,146,054 | 8/1964 | Shearer et al. | 339/186 M |
| 3,177,462 | 4/1965 | Sarnmark | 339/186 M |
| 3,194,588 | 7/1965 | Buckey et al. | 285/DIG. 15 X |
| 3,287,031 | 11/1966 | Simmons et al. | 339/186 R X |
| 4,099,745 | 7/1978 | Cobbs | 285/DIG. 15 X |
| 4,111,514 | 9/1978 | Brishka et al. | 285/DIG. 15 X |
| 4,280,723 | 7/1981 | Moldestad | 285/DIG. 15 X |

FOREIGN PATENT DOCUMENTS

| 816582 | 7/1969 | Canada | 285/DIG. 15 |
|---|---|---|---|
| 771968 | 4/1957 | United Kingdom | 285/DIG. 15 |
| 838837 | 6/1981 | U.S.S.R. | 339/186 R |

Primary Examiner—Thomas F. Callaghan
Attorney, Agent, or Firm—Brisebois & Kruger

[57] ABSTRACT

This invention provides an oil-feeding coupling consisting of male and female coupling members capable of being engaged with each other only when predetermined portions thereof are opposed to each other, a guide ring fitted around the male coupling member and adapted to set an engaging position thereof in accordance with the kind of an oil to be fed to an underground tank, and positioning portions formed in the female coupling member so as to engage the guide ring therewith, whereby the male and female coupling members can be engaged with each other only when the guide ring is set in a predetermined rotary position with respect to the male coupling member.

1 Claim, 7 Drawing Figures

STRUCTURE FOR PREVENTION OF MIXING OF DIFFERENT KINDS OF OILS FOR OIL-FEEDING COUPLINGS

SUMMARY OF THE INVENTION

When an oil is fed from a tank lorry to an underground tank in a filling station, a male coupling member is attached at one end thereof to an oil-feeding hose connected to the tank lorry. The resulting male coupling member is fitted at the other end thereof into a female coupling member, which is connected at the other end thereof to an oil feed inlet of the underground tank. In a filling station, various kinds of oils, such as lead-containing gasoline, leadless gasoline, light oil, and kerosene are stored in their respective underground tanks. When an oil is fed to any of these underground tanks, an oil-feeding coupling is used. Since oil-feeding couplings of the same construction are used for feeding these kinds of oils to the underground tanks, the worker often makes a mistake to mix a different kind of oil in the oil contained in the underground tank.

In order to prevent a different kind of oil from being mixed in the oil contained in an underground tank, the present invention provides a structure for the prevention of the mixing of different kinds of oils for oil-feeding couplings, which consists of a female coupling member attached to an oil feed inlet of an underground tank, and a male coupling member attached to an oil-feeding hose connected to a tank lorry, the female and male coupling members being able to be engaged with each other only when the kind of the oil contained in the underground tank and that of an oil to be fed from the hose thereto are in agreement with each other, whereby an oil, the kind of which is different from that of the oil contained in the underground tank, is not fed from the hose thereto by mistake.

DESCRIPTION OF THE PREFERRED EMBODIMENTS

Figure 1:
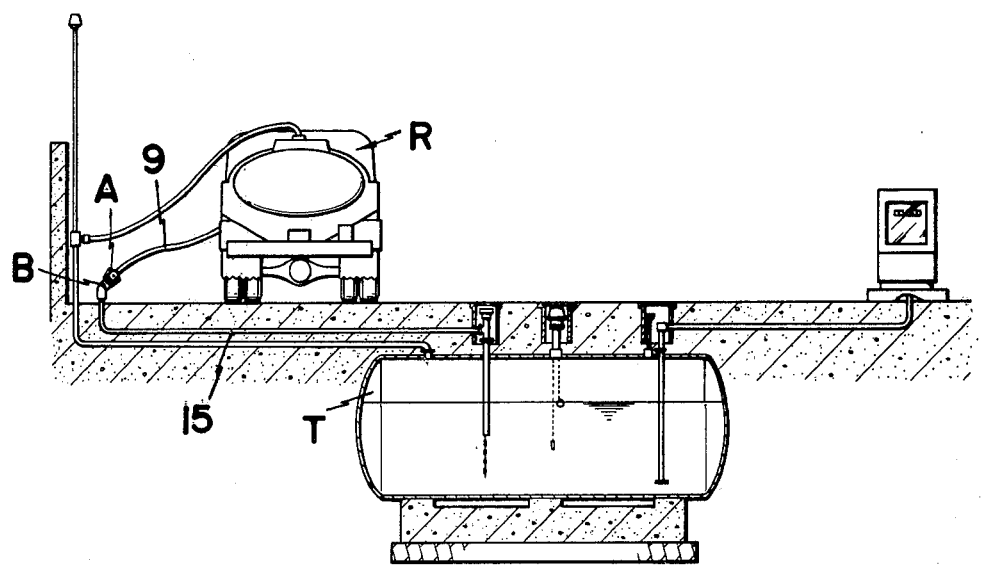
FIG. 1 illustrates a filling station with a structure for the prevention of the mixing of different kinds of oils for oil-feeding couplings according to the present invention in practical use.
Figure 2:
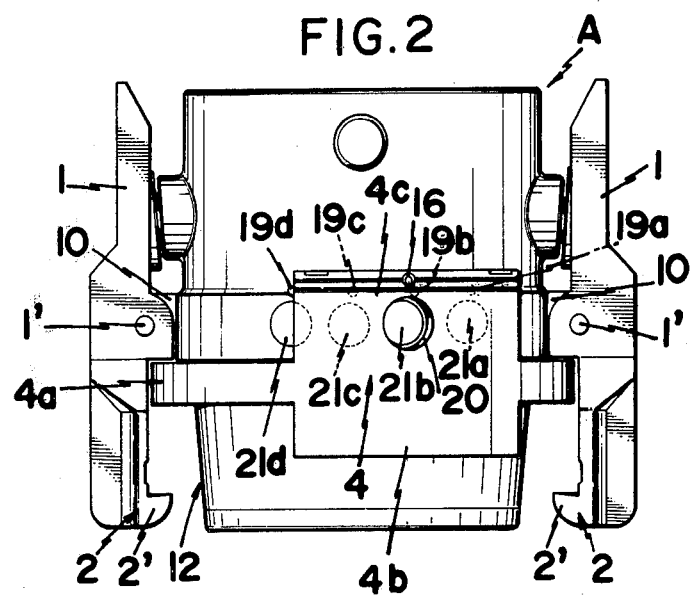
FIG. 2 is a front elevational view of a male coupling member.
Figure 3:
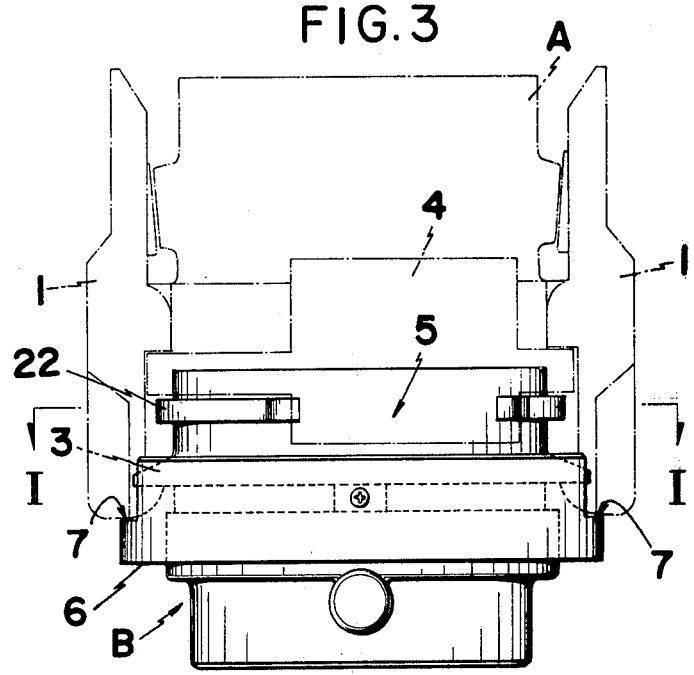
FIG. 3 is a front elevational view of a female coupling member.
Figure 7:
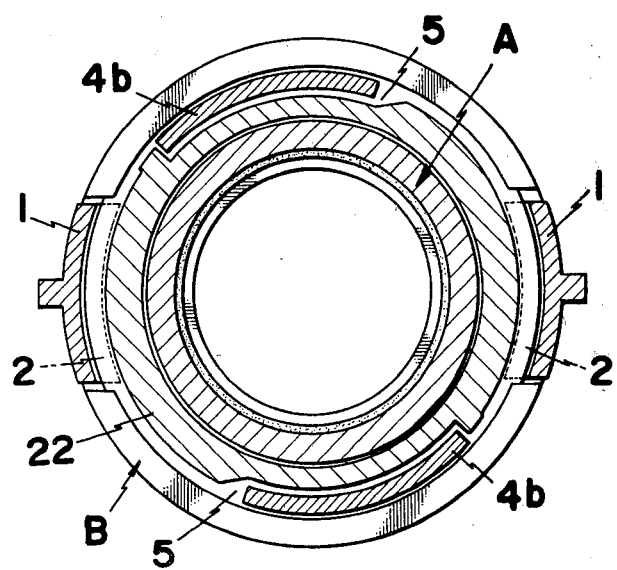
FIG. 7 is a sectional view of I—I line in FIG. 3.
Figure 4:
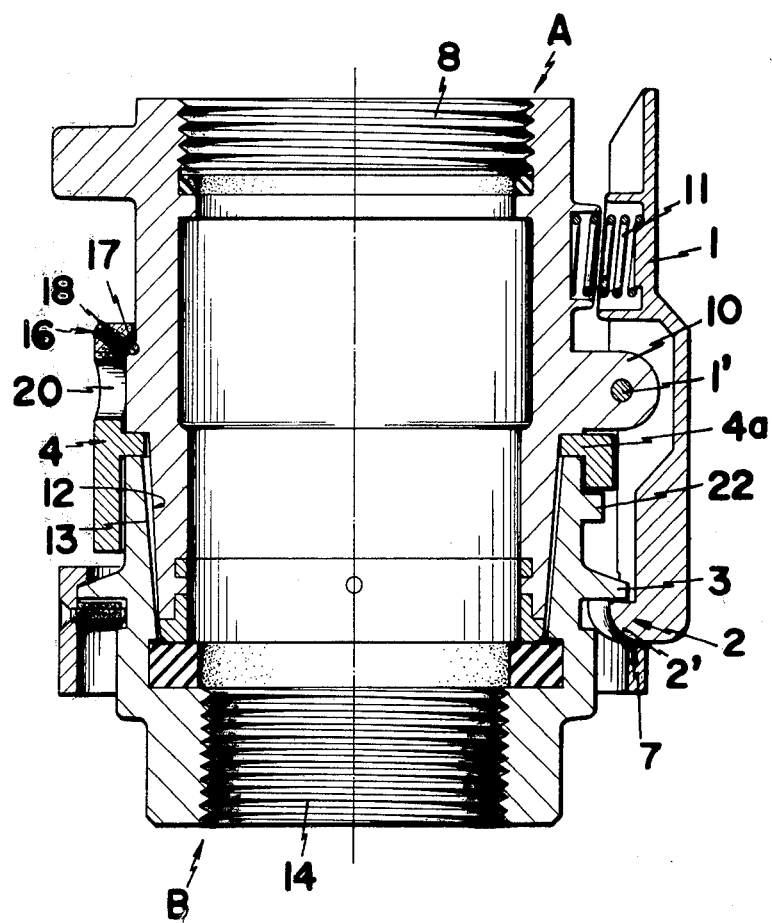
FIG. 4 is a sectional view illustrating the male and female coupling members, which are in an engaged state.
Figure 5:
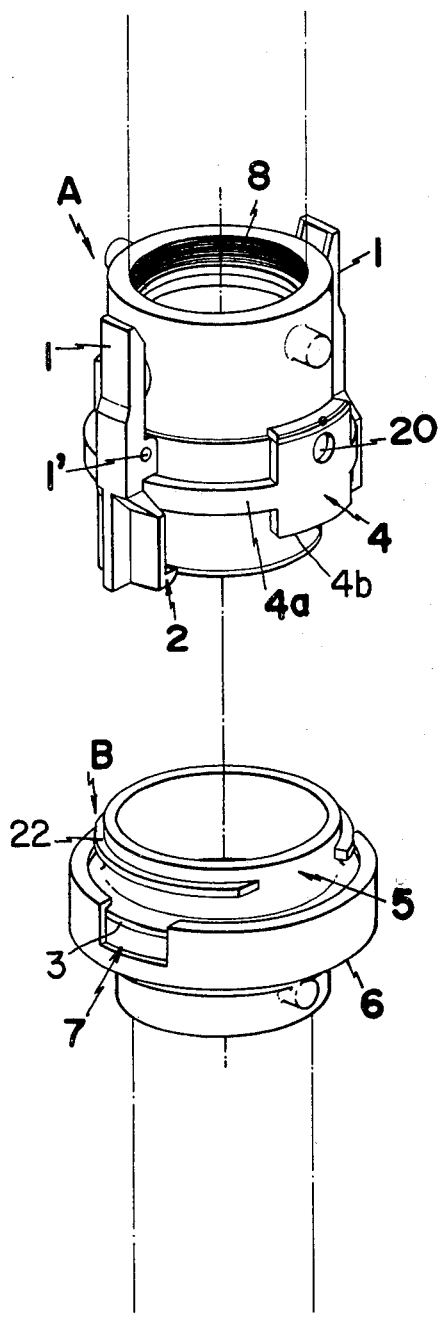
FIG. 5 is a perspective view illustrating the male and female coupling members, which are in a prior-to-engagement state.
Figure 6:
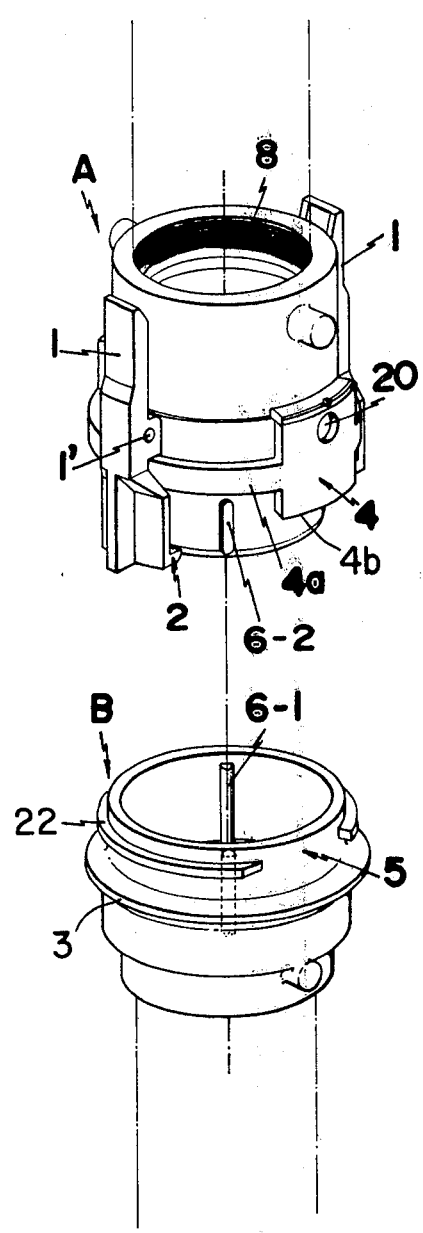
FIG. 6 is a perspective view illustrating another embodiment of the present invention.

As shown in FIG. 4, a lower end portion of a male coupling member A is fitted detachably into an upper end portion of a female coupling member B, and locking levers 1, 1 are pivotably connected 1', 1' to the outer circumferential portion of the male coupling member A, locking portions 2, 2 at lower ends of the locking levers 1, 1 being detachably engaged with locking projections 3 provided on the outer circumferential surface of the female coupling member B, to thereby form an oil-feeding coupling. The male coupling member A can be engaged with the female coupling member B only when the former is in a predetermined rotary position with respect to the latter. A guide ring 4 is fitted around the outer circumferential surface of the male coupling member A in such a manner that the guide ring 4 can be set with respect to the male coupling member A to an arbitrary rotary position corresponding to a predetermined kind of oil. Positioning portions 5, with which the guide ring 4 is to be engaged, are formed in the outer circumferential surface of the female coupling member B. The male and female coupling members A, B can be engaged with each other only when the guide ring 4 is set in a predetermined rotary position with respect to the male coupling member A.

Reference numeral 8 denotes a threaded connecting portion formed at an upper end section of the male coupling member A, and adapted to join thereto an upper end portion of an oil-feeding hose 9 connected to a tank lorry R, and 10, 10 brackets projecting from the opposite portions of the outer circumferential surface of the male coupling member A. The locking levers 1, 1 are connected pivotably 1', 1' at their respective intermediate portions to the brackets 10, 10. A spring 11 is provided at an upper end portion of each of the locking levers 1, 1 to allow the locking portion 2 thereof to be urged inward about the pivoted portion 1', which serves as a fulcrum. Reference numeral 2' denotes an arcuate surface formed on the inner side of each of the locking portions 2, 12 a tapered surface formed on the outer circumference of a lower end portion of the male coupling member A, and 13 a tapered surface formed on the inner circumference of an upper end portion of the female coupling member B, the male and female coupling members A, B being engaged with each other at these tapered surfaces 12, 13. Reference numeral 14 denotes a threaded connecting portion formed at a lower end section of the female coupling member B, and adapted to join thereto an upper end portion of an oil supply hose 15 connected to an underground tank T, and 6 a positioning ring fitted around the outer circumferential surface of the female coupling member B, and provided in the opposite portions of the outer circumferential surface thereof with recesses 7, 7, with which the locking portions 2, 2 of the locking levers 1, 1 are to be engaged. The male coupling member A can be engaged with the female coupling member B only when the male coupling member A is set in a rotary position, in which the locking portions 2, 2 can be fitted into the recesses 7, 7. Namely, when the locking portions 2, 2 are fitted into the recesses 7, 7, the male coupling member A is set in a predetermined rotary position with respect to the female coupling member B, only in which position these coupling members can be engaged with each other.

In order to bring the male and female coupling members A, B into engagement with each other, the male coupling member A is pushed downward into the female coupling member B with the arcuate surfaces 2' of the locking portions 2 slided on the outer surfaces of the locking projections 3 to cause the locking levers 1 to be moved pivotally in the outward direction against the springs 11. When the locking portions 2 have advanced beyond the locking projections 3, the locking levers 1 are urged inward to allow the locking portions to be engaged with the locking projections 3, so that the coupling members A, B are set in an engaged state. In order to disengage the coupling members A, B from each other, the upper end portions of the locking levers 1 are pressed against the springs 11 to move the locking portions 2 pivotally in the outward direction and thereby disengage the locking portions 2 from the locking projections 3. When the male coupling member A is then drawn upward, the coupling members A, B can be disengaged from each other.

Reference numeral 4a denotes a ring portion of the guide ring 4. The ring portion 4a is fitted around the outer circumferential surface of the male coupling member A in such a manner that the ring portion 4a can be moved therearound. Reference numerals 4b, 4b denote guide portions of the guide ring 4, which project downward in an opposed relationship from the lower surfaces of the ring portion 4a, and 16 a clinker mechanism adapted to set a rotary position of the guide ring 4 with respect to the male coupling member A. The clinker mechanism 16 consists of an upwardly extending member 4c formed on the upper surface of the ring portion 4a, and a steel ball 17 supported in the inner surface of an upper end portion of the upwardly extending member 4c by a spring 18 in such a manner that the steel ball 17 is urged inward. On the other hand, hemispherical recesses 19a, 19b, 19c, 19d are provided at regular intervals in the outer circumferential surface of the male coupling member A. When the steel ball 17 is brought into engagement with one of the hemispherical recesses, the guide ring 4 can be set in a rotary position in accordance with a predetermined kind of oil.

In order to provide a means for ascertaining that the guide ring 4 is set in a predetermined rotary position, an eyehole 20 is formed in the upwardly extending member 4c, and marks 21a, 21b, 21c, 21d of different colors corresponding to different rotary positions of the guide ring 4 are put on the outer circumferential surface of the male coupling member A. Thus, the rotary position of the guide ring 4 can be ascertained by checking the colored mark in alignment with the eyehole 20.

Reference numerals 22, 22 denote positioning projections extended outward from opposite portions of the outer circumferential surface of the female coupling member B. Since the projections 22, 22 are provided separately at two portions of the outer circumferential surface of the female coupling B, recesses are formed in those portions of the outer circumferential surface of the female coupling member B which are between the projections 22, 22. These recesses constitute the positioning portions 5, 5, with which the guide portions 4b, 4b of the guide ring 4 are to be engaged.

When a rotary position of the male coupling A, in which the coupling members A, B can be engaged with each other, a rotary position of the guide ring 4 which respect to the male coupling member A, a position in which the guide portions 4b, 4b of the guide ring 4 are aligned with the positioning portions 5, 5 have correct relative relation with the guide ring 4 set in a predetermined rotary position with respect to the male coupling member A, the locking portions 2, 2 of the locking levers 1 are alinged with the recesses 7, 7 in the positioning ring 6, and the guide portions 4b, 4b of the guide ring 4 with the recesses, i.e. the positioning portions 5, 5 simultaneously.

The positioning ring 6 in this embodiment is formed so as to be fitted around the female coupling member B in such a manner that the positioning ring 6 can be moved freely with respect to the female coupling member B to change the positions of the recesses 7, 7 therein in accordance with a predetermined kind of oil.

In another embodiment of the invention, a positioning projection and a positioning recess 6-1, 6-2 instead of the positioning ring 6 are formed at a lower end portion, i.e. an engaging portion, of a male coupling member A, and an upper end portion, i.e. an engaging portion, of a female coupling B.

How to use the structure according to the present invention will now be described. A plurality of rotary positions of the guide ring 4 with respect to the male coupling member A are determined so as to correspond to lead-containing gasoline, leadless gasoline, light oil, and kerosene. Female coupling members are attached to oil supply hoses connected to underground tanks containing such different kinds of oils. The positioning rings fitted around these female coupling members are set to predetermined rotary positions to allow the recesses 7, 7 in the former to correspond to predetermined different rotary positions of the guide ring 4 with respect to the male coupling member A. In order to feed an oil from a tank lorry R to an underground tank, the guide ring 4 is set to a predetermined position with respect to the male coupling member A in accordance with the kind (for example, leadless gasoline) of the oil, and the resulting male coupling member A is fitted into the female coupling member B attached to the oil supply hose connected to the underground tank T containing leadless gasoline. When this female coupling member B is certainly so set as to correspond to leadless gasoline, the guide portions 4b, 4b are also aligned with the recesses 5, 5 at such time that the locking portions 2, 2 are inserted into the recesses 7, 7, to allow the guide portions 4b, 4b to be engaged with the recesses 5, 5. Accordingly, the coupling members A, B can be engaged with each other. When the worker applies this male coupling member A to a female coupling member B set on the hose for the underground tank containing other kind of oil (for example, light oil), by mistake, the guide portions 4b, 4b and recesses 5, 5 are not aligned with each other, so that the coupling members A, B cannot be engaged with each other. Thus, the mixing of different kinds of oils can be prevented. In order to feed other kind of oil (for example, kerosene) to the corresponding underground tank, the guide ring 4 is turned to a rotary position corresponding to kerosene, so that the relative male coupling member is set so as to be engaged with only such a female coupling member that has been set to correspond to kerosene. In order to conduct the above-mentioned oil-feeding operation, the guide ring 4 has only to be positioned with respect to the male coupling member A in accordance with the kind of the object oil. Therefore, this male coupling member A can be applied to a plurality of underground tanks containing different kinds of oils.

The present invention described above permits an operation for feeding an oil from a tank lorry to an underground tank to be conducted conveniently; it permits feeding reliably to an underground tank an oil the kind of which is in agreement with that of the oil contained therein, preventing a worker in a filling station from feeding to an object underground tank an oil different from the oil contained therein, and using a single male coupling member for operations for feeding different kinds of oils to the corresponding underground tanks.

What is claimed is:

1. A fluid coupling arrangement for minimizing the danger of connecting and transferring an undesired fluid through the coupling comprising, a first coupling member, latching means on said first coupling member for detachably connecting and latching said first coupling member to any one of several second coupling members upon movement of the first coupling member to a coupling position with respect to a second coupling member, and means to permit movement of said coupling members to said coupling position only when said second coupling member corresponds to said first coupling member, said means comprising, cooperating surface and projection means for engaging said first member with a second member only when the first member is in a predetermined angularly aligned position with respect to a second member, said latching means comprising, locking levers pivotally connected to said first coupling member at circumferentially spaced apart locations on the first coupling member, said locking levers projecting toward said second member and having locking portions at ends thereof, said locking portions being detachably engageable with locking projections of the second member, said cooperating surface and projection means comprising said end portions of said locking levers, and recesses in a ring on said second member circumferentially spaced apart the same distance as said locking levers, said recesses exposing said locking projections for engagement by said levers, said ring being circumferentially adjustable to preset the second coupling in accordance with the desired fluid to be transferred, and adjustable means mounted on said first coupling member for movement to a plurality of different circumferential positions indicative of the fluid to be transferred by the coupling member, means for retaining said circumferentially adjustable means in each of said circumferential positions, abutment means on said adjustable means for permitting connecting of said first member only to a second coupling member having a fixed surface mateable with said abutment means, different ones of said second coupling members having their respective rings set at different positions thereon corresponding to different positions of adjustment of said adjustable means, so that said first coupling member can be moved to said coupling position and connected only to a second member having a correspondingly adjusted ring, for each different position of adjustment of the adjustable means.

* * * * *